(12) United States Patent
Flores (10) Patent No.: US 8,181,830 B2
(45) Date of Patent: May 22, 2012

(54) POWDER DISPENSER

(76) Inventor: Roger N. Flores, Moreno Valley, CA (US)

(*) Notice: Subject to any disclaimer, the term of this patent is extended or adjusted under 35 U.S.C. 154(b) by 395 days.

(21) Appl. No.: 12/434,020

(22) Filed: May 1, 2009

(65) Prior Publication Data

US 2010/0012683 A1    Jan. 21, 2010

Related U.S. Application Data

(60) Provisional application No. 61/081,159, filed on Jul. 16, 2008.

(51) Int. Cl.
*G01F 11/18* (2006.01)
*G01F 11/14* (2006.01)
*G01F 11/12* (2006.01)
*G01F 11/10* (2006.01)

(52) U.S. Cl. .............. 222/361; 222/1; 222/344

(58) Field of Classification Search .......... 222/1, 344, 222/354, 355, 361, 366, 448, 449, 451–453, 222/513, 514

See application file for complete search history.

(56) References Cited

U.S. PATENT DOCUMENTS

| | | | |
|---|---|---|---|
| 3,056,532 A * | 10/1962 | Germano | 222/361 |
| 4,961,521 A | 10/1990 | Eckman | |
| 5,588,563 A | 12/1996 | Liu | |
| 5,947,336 A | 9/1999 | Thompson | |
| 6,189,742 B1 | 2/2001 | Thomson et al. | |
| 6,315,170 B1 | 11/2001 | Thomson et al. | |
| 6,962,274 B1 | 11/2005 | Sherman | |
| 2006/0144872 A1 | 7/2006 | Israel et al. | |
| 2006/0255074 A1* | 11/2006 | Amir | 222/361 |

* cited by examiner

*Primary Examiner* — Darren W Gorman
(74) *Attorney, Agent, or Firm* — James Ray & Assoc (57) ABSTRACT

A powder dispenser includes a substantially hollow open top housing. A first cover is engageable with such housing and includes a first aperture. A measuring member including a cavity is slidably connected to an interior of such first cover and moveable between a first position within such first cover and a second position substantially outside thereof. When such first aperture and such cavity are substantially aligned, and such housing inverted, such cavity receives powder from within such housing. A second cover fits over such first cover and has a second aperture for allowing such powder from within such cavity to pass there through and into a container when such cavity and second aperture are aligned and inverted. A sidewall extending downward from such second cover includes an opening for such measuring member to pass partially there through. Such second cover member is rotatable around such first cover member.

6 Claims, 12 Drawing Sheets

POWDER DISPENSER

CROSS REFERENCE TO RELATED APPLICATION

This patent application is related to and claims priority from U.S. Provisional Patent Application Ser. No. 61/081,159 filed Jul. 16, 2008.

FIELD OF THE INVENTION

The present invention relates, in general, to a powder dispenser and, more particularly, this invention relates to a powdered baby formula dispenser.

BACKGROUND OF THE INVENTION

Prior to the conception and development of the present invention, it is generally well known in the prior art to feed infants bottles of formula. Such formula may be bought in a pre-mixed form or may be purchased in powdered form and made by mixing the powdered formula with water. Unfortunately, pre-mixed formula is not economical and tends to spoil quickly once opened. Powdered formula is difficult to measure and hard to use when on the go. Moreover, once mixed with water, the formula must be refrigerated making it less desirable to pre-mix bottles.

Specifically of interest to the present invention are the following: Sherman, U.S. Pat. No. 6,962,274, discloses a hand-operated device for measuring, dispensing and storing of powder, granular and grain materials. The device includes a container wherein the material is stored and a measuring and dispensing unit attached to the container.

Thompson, U.S. Pat. No. 5,947,336, discloses a dry food dispenser having a cylindrical container with a removable cap for covering a central storage area holding dry food commodity. The mid-section of the container includes a tapered funnel terminating in an opening. A rotatable cylinder is operably carried on the funnel having a pre-measured receptacle or cavity co-extensive with the funnel opening for collecting a quantity of the dry food product. Upon rotation of the cylinder, the receptacle carries the product from the funnel for external dispensing into a utility container for usage.

Liu, U.S. Pat. No. 5,588,563, discloses a dispenser including a cylindrical body. Powder stored in the body can pass through the flow-through opening on the periphery of the separator plate into a measuring space. The powder is then dispensed through an outlet in the cover.

Eckman, U.S. Pat. No. 4,961,521, discloses an adjustable metering dispenser apparatus having a container for holding free-flowing materials. The top of the container has at least one opening therein and a cap is provided for opening or closing the top. The cap is rotatable for allowing it to be moved between the open and closed position.

Israel, et al, U.S. Publication No. 2006/0144872, discloses a container. A consumer is meant to insert a consumable product into a main storage area of the container. A lid is secured to the top of the container. By tipping the container to the proper angle, product from main storage area is forced into holding barrier volume at the top of the container resulting in a specific amount of product to be held by the barrier. The container is then tipped upright and the measured product amount drops into the bottom of a measure compartment. The container is then inverted once more with the top of measure compartment now open, thereby allowing the measured product to be dispensed from the container, whereby the product from the main storage area is again forced into the holding barrier and process may be repeated.

SUMMARY OF THE INVENTION

The present invention provides a powder dispenser comprising a substantially hollow housing member for receiving and housing a first predetermined amount of a predetermined powder. Such housing member is manufactured from a first predetermined material and has a first predetermined shape and a first predetermined size. Such housing member further has an open top end and a closed bottom end. A first cover member is manufactured from a second predetermined material and has a second predetermined size and a second predetermined shape. Such first cover member includes a first aperture disposed there through at a first predetermined location for enabling such predetermined powder to pass there through and such first cover member is releasably engageable with such housing member closely adjacent such open top end. A measuring member is manufactured from a third predetermined material and has a third predetermined size and a third predetermined shape. Such measuring member includes an open-ended cavity disposed there through for at least one of housing a second predetermined amount of such predetermined powder, transporting a second predetermined amount of such predetermined powder, dispensing a second predetermined amount of such predetermined powder, and a combination thereof. Such measuring member is slidably connected to an interior portion of such first cover member via a spring means such that such measuring member is moveable between a first position within such interior portion of such first cover member wherein such first aperture of such first cover member and such cavity of such measuring member are not aligned and a second position wherein such measuring member extends substantially outside of such first cover member such that such first aperture of such first cover member and such cavity of such measuring member are substantially aligned so that such second predetermined amount of such predetermined powder may pass through such first aperture and into such cavity when such powder dispenser is inverted, such spring means exerting pressure on such measuring member such that such measuring member is predisposed to move generally towards such second position. A second cover member is manufactured from a fourth predetermined material and has a fourth predetermined size and a fourth predetermined shape. Such second cover member is for fitting over and at least partially enclosing such first cover member, such second cover member includes a top covering portion having a second aperture disposed there through at a second predetermined location, at least one sidewall extends downward from such top covering portion closely adjacent edges there of and such at least one side wall includes an opening disposed there through at a third predetermined location for allowing such measuring member to pass at least partially there through when such second cover member is disposed on such first cover member in a predetermined position. Such second cover member further being rotatable around such first cover member for enabling a user to position such measuring member and such second cover member such that at least one of such measuring member is in such second position extending through such opening such that such first aperture and such cavity are aligned; such measuring member is in such first position such that such cavity and such second aperture are aligned so that such second predetermined amount of such predetermined powder may be dispensed from such cavity through such second aperture into a predetermined container; such measuring member is secured in such first position such that such cavity and such second aperture are not aligned so that such predetermined powder is prevented from being dispensed through such second aperture; and a combination thereof.

According to another embodiment, a method of dispensing powder from a powder dispenser includes the steps of providing a powder dispenser including a substantially hollow housing member for receiving and housing a first predetermined amount of a predetermined powder, such housing member further having an open top end and a closed bottom end, a first cover member including a first aperture disposed there through at a first predetermined location for enabling such predetermined powder to pass there through and such first cover member being releasably engageable with such housing member closely adjacent such open top end, a measuring member including an open-ended cavity disposed there through for at least one of housing a second predetermined amount of such predetermined powder, transporting a second predetermined amount of such predetermined powder, dispensing a second predetermined amount of such predetermined powder, and a combination thereof, such measuring member being slidably connected to an interior portion of such first cover member via a spring means such that such measuring member is moveable between a first position within such interior portion of such first cover member wherein such first aperture of such first cover member and such cavity of such measuring member are not aligned and a second position wherein such measuring member extends substantially outside of such first cover member such that such first aperture of such first cover member and such cavity of such measuring member are substantially aligned so that such second predetermined amount of such predetermined powder may pass through such first aperture and into such cavity when such powder dispenser is inverted, such spring means exerting pressure on such measuring member such that such measuring member is predisposed to move generally towards such second position; a second cover member for fitting over and at least partially enclosing such first cover member, such second cover member includes a top covering portion having a second aperture disposed there through at a second predetermined location, at least one sidewall extends downward from such top covering portion closely adjacent edges there of and such at least one side wall includes an opening disposed there through at a third predetermined location for allowing such measuring member to pass at least partially there through when such second cover member is disposed on such first cover member in a predetermined position, such second cover member further being rotatable around such first cover member for enabling a user to position such measuring member and such second cover member such that at least one of such measuring member is in such second position extending through such opening such that such first aperture and such cavity are aligned, such measuring member is in such first position such that such cavity and such second aperture are aligned so that such second predetermined amount of such predetermined powder may be dispensed from such cavity through such second aperture into a predetermined container, such measuring member is secured in such first position such that such cavity and such second aperture are not aligned so that such second predetermined amount of such predetermined powder is prevented from being dispensed through such second aperture, and a combination thereof; filling such housing member with a predetermined amount of such predetermined powder; securing such first cover member to such housing member; securing such second cover member to such first cover member and moving such measuring member such that such first aperture is aligned with such cavity; inverting such powder dispenser such that such second predetermined amount of such predetermined powder fills such cavity; and moving such measuring member such that such cavity is aligned with such second aperture so that such second predetermined amount of such predetermined powder passes out of such cavity through such second aperture and into a predetermined container.

OBJECTS OF THE INVENTION

It is, therefore, one of the primary objects of the present invention to provide a device for storing, measuring, and dispensing predetermined amounts of powdered baby formula.

Another object of the present invention is to provide a compact and portable device for storing, measuring, and dispensing, predetermined amounts of powdered baby formula which is easy and convenient to use.

Still another object of the present invention is to provide a powder dispenser, especially convenient for storing and dispensing powder which may be mixed with water to form a consumable drink, such powder dispenser dispensing a predetermined amount of such powder such that such powder may be easily mixed with a predetermined amount of water.

Yet another object of the present invention is to provide a baby formula dispensing device which dispenses one ounce of powdered formula each time a dispensing mechanism is engaged by a user.

An additional object of the present invention is to provide a device which may be used to store and dispense powdered infant formula, such that a user can easily transport such device wherever such user travel and whenever such user is in need of preparing a bottle of mixed formula such device may be used to dispense the required amount of powdered formula needed for preparing such bottle of mixed formula.

Still another object of the present invention is to provide a method of dispensing powder from a powder dispenser so that baby formula can be easily and conveniently measured and mixed from powdered formula contained within such powder dispenser.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Reference is now made, more particularly, to FIGS. 1-12.

Figure 1:
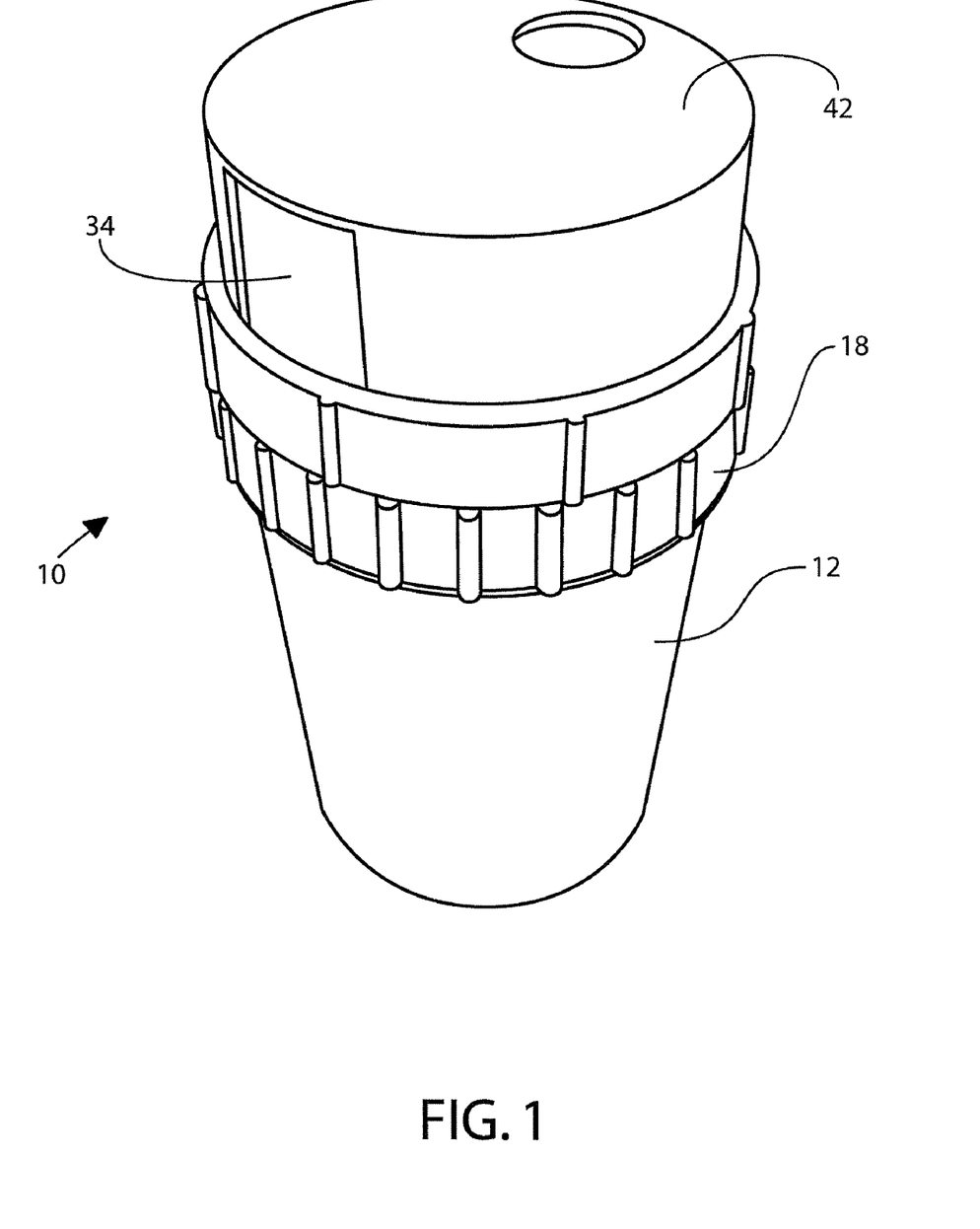
FIG. 1 is a partial perspective view of the invention according to one embodiment of the invention.
Figure 2:
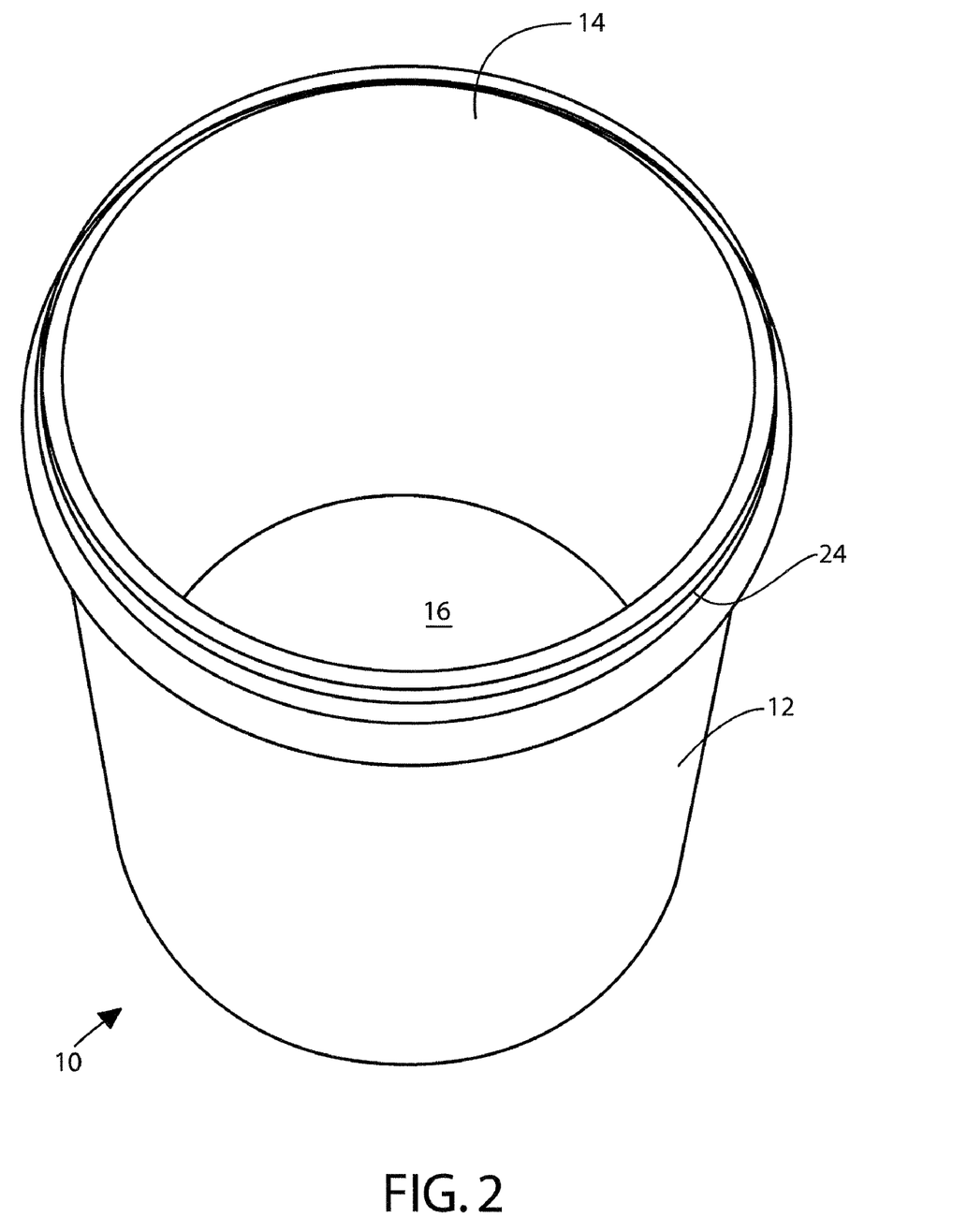
FIG. 2 is a partial perspective view of the housing member of the invention according to one embodiment of the invention.

A powder dispenser, generally designated 10, includes a substantially hollow housing member 12 for receiving and housing a first predetermined amount of a predetermined powder (not shown). Such housing member 12 is manufactured from a first predetermined material and has a first predetermined shape and a first predetermined size. It is presently preferred that such first predetermined material is plastic. Such housing member 12 further has an open top end 14 and a closed bottom end 16. It is presently preferred that such first predetermined amount of such predetermined powder is between about 10.0 ounces and about 15.0 ounces. It is presently preferred that such predetermined powder is at least one of powdered infant formula, powdered cereal, powdered drink mix, and a combination thereof. It is presently most preferred that such predetermined powder is powdered infant formula.

Figure 3A:
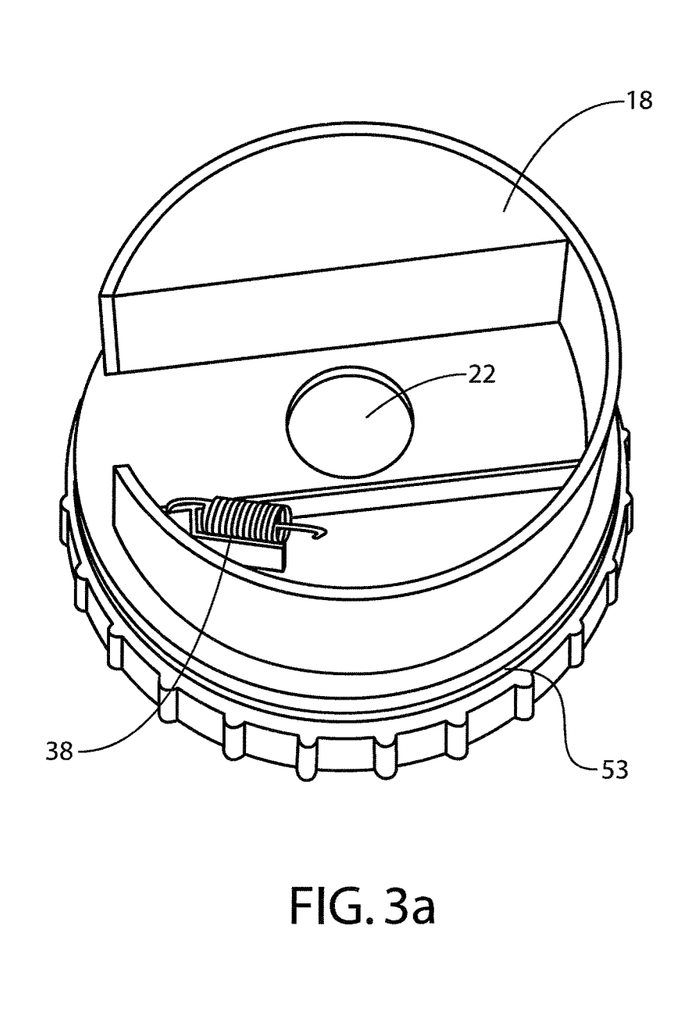
FIG. 3a is a partial perspective view of the first cover member of the invention according to one embodiment of the invention.

A first cover member 18 is manufactured from a second predetermined material and has a second predetermined size and a second predetermined shape. It is presently preferred that such second predetermined material is plastic. Such first cover member 18 includes a first aperture 22 disposed there through at a first predetermined location for enabling such predetermined powder to pass there through and such first cover member 18 is releasably engageable with such housing member 12 closely adjacent such open top end 14.

It is presently preferred that such housing member 12 includes a first threaded portion 24 disposed thereon closely adjacent an outer top portion thereof and such first cover member 18 includes a second threaded portion 28 disposed thereon closely adjacent a bottom inner portion thereof, such first threaded portion 24 and such second threaded portion 28 being engageable with each other.

Figure 3B:
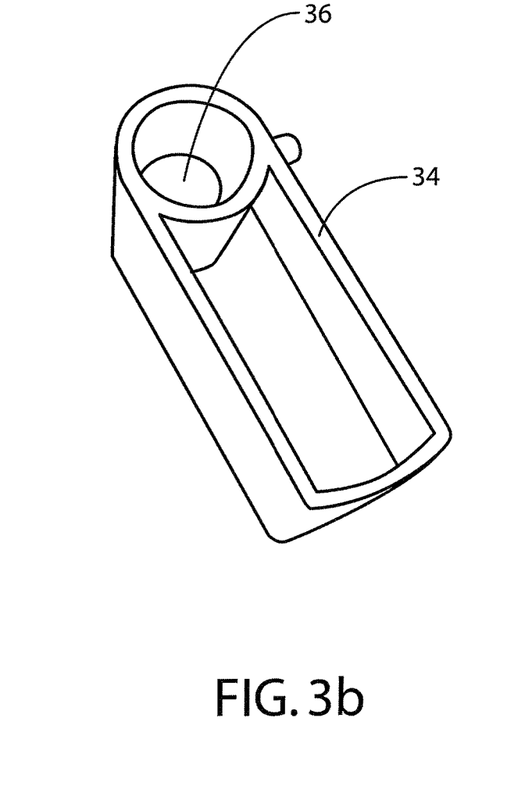
FIG. 3b is a partial perspective view of the measuring member of the invention according to one embodiment of the invention.
Figure 4:
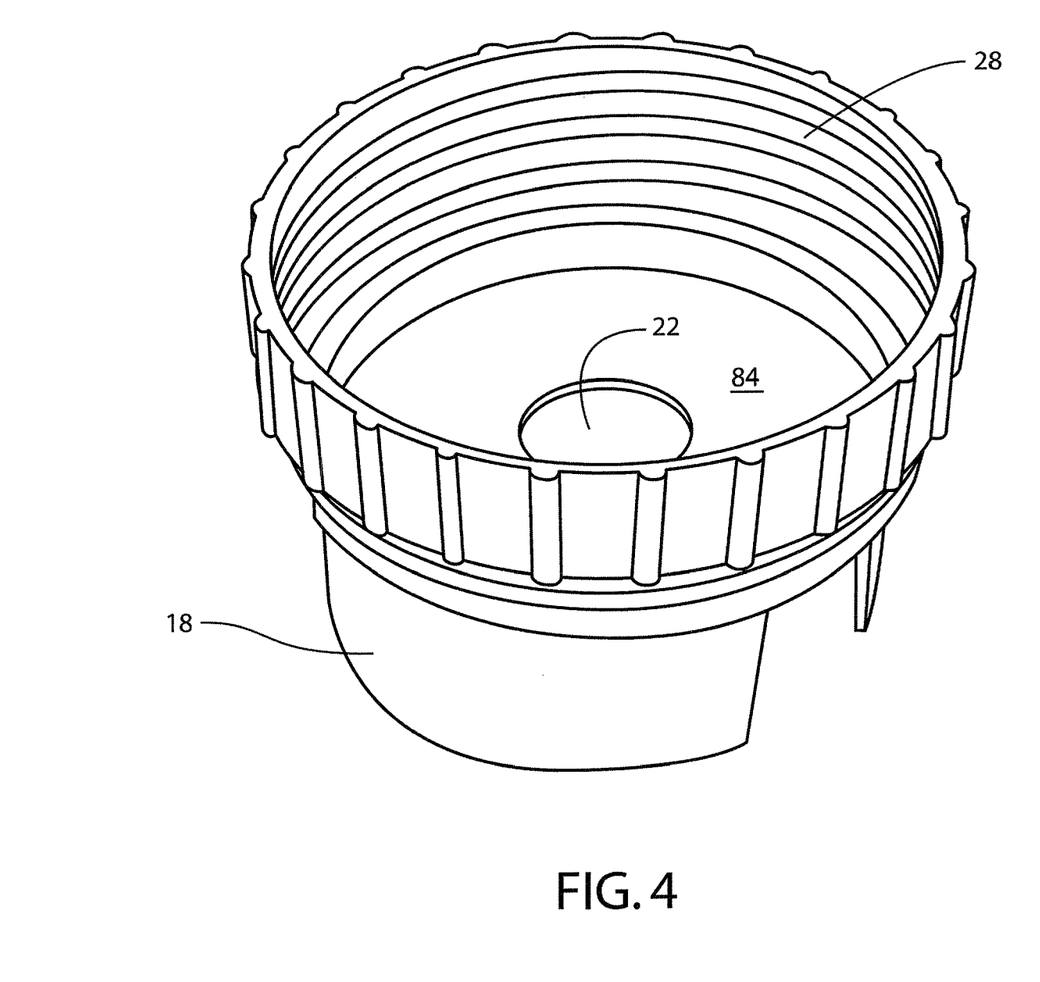
FIG. 4 is a partial perspective bottom view of the first cover member of the invention according to one embodiment of the invention.

A measuring member 34 is manufactured from a third predetermined material and has a third predetermined size and a third predetermined shape. It is presently preferred that such third predetermined material is plastic. Such measuring member 34 includes an open-ended cavity 36 disposed there through for at least one of housing a second predetermined amount of such predetermined powder, transporting a second predetermined amount of such predetermined powder, dispensing a second predetermined amount of such predetermined powder, and a combination thereof. It is presently preferred that such second predetermined amount of such predetermined powder is between about 0.5 ounce and about 1.5 ounces. It is presently most preferred that such second predetermined amount of powder is about 1.0 ounce.

Figure 11:
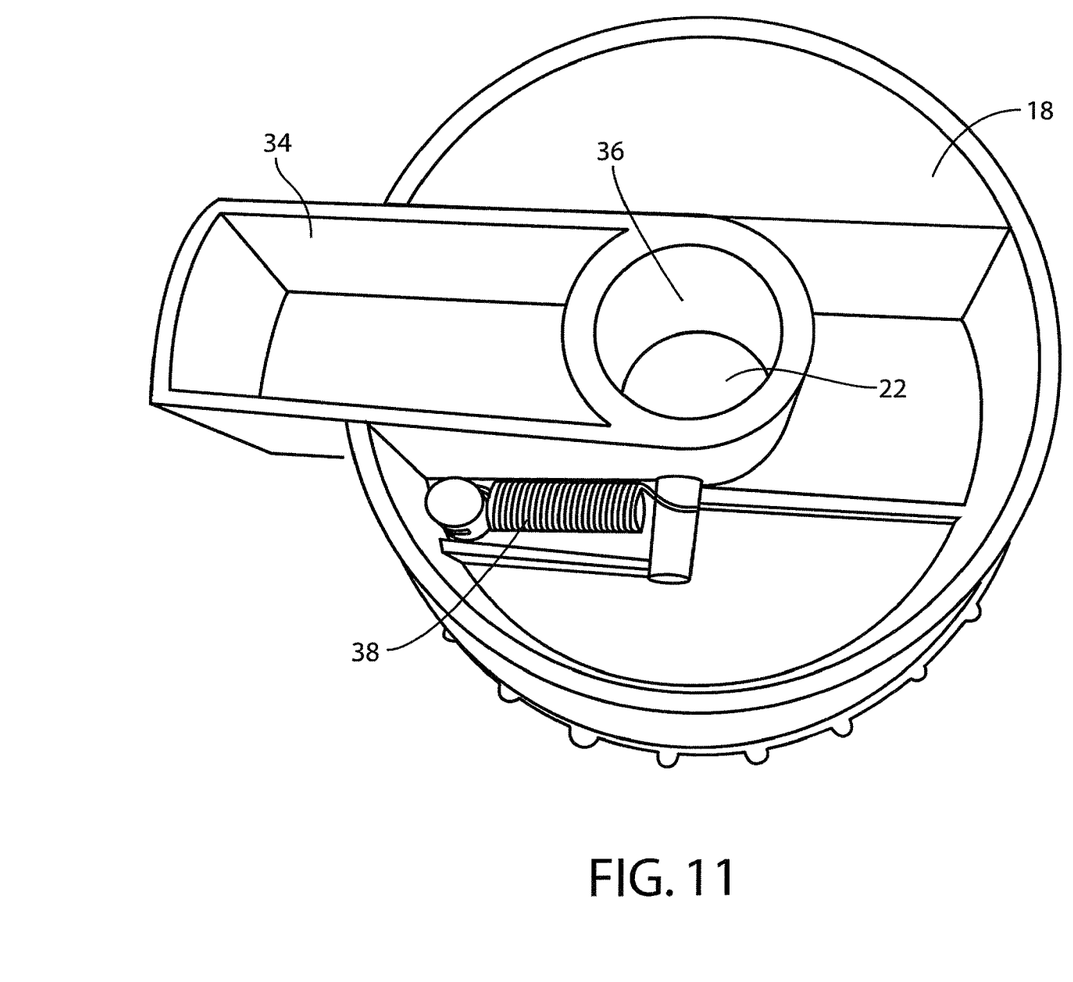
FIG. 11 is a partial perspective view of the first cover member with the measuring member attached thereto via a spring means according to one embodiment of the invention; the measuring member is in such second position and the cavity is aligned with such first aperture.
Figure 12:
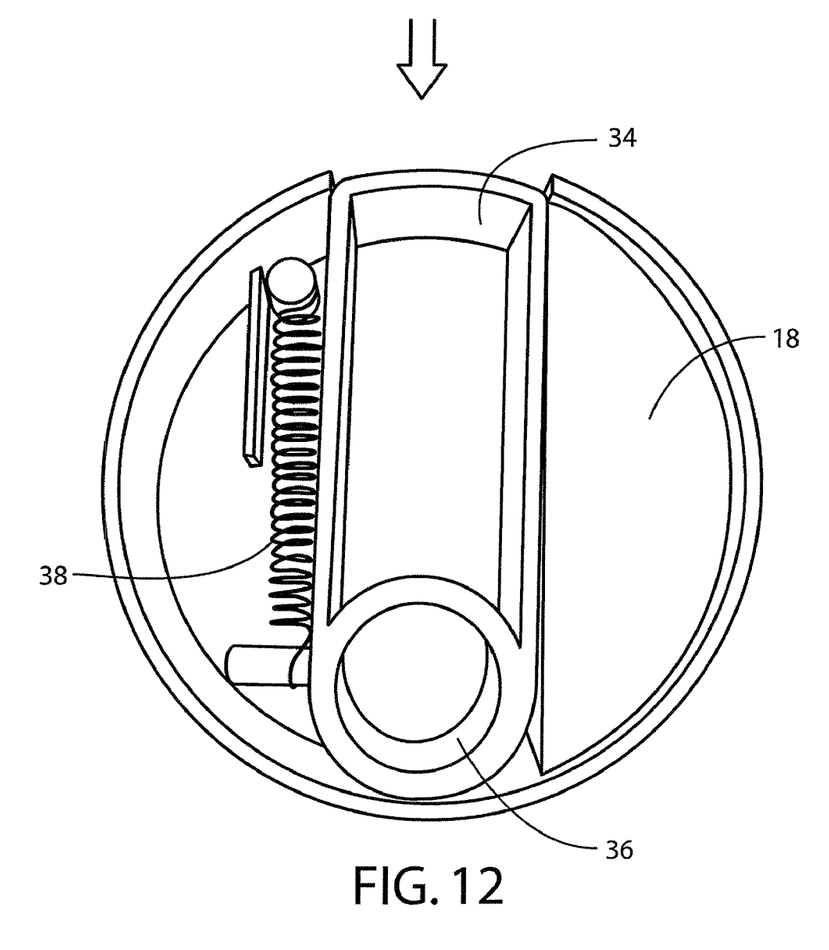
FIG. 12 is a partial perspective view of the first cover member with the measuring member attached thereto via a spring means according to one embodiment of the invention; the measuring member is in such first position.

Such measuring member 34 is slidably connected to an interior portion of such first cover member 18 via a spring means 38 such that such measuring member 34 is moveable between a first position within such interior portion of such first cover member 18 wherein such first aperture 22 of such first cover member 18 and such cavity 36 of such measuring member 34 are not aligned and a second position wherein such measuring member 34 extends substantially outside of such first cover member 18 such that such first aperture 22 of such first cover member 18 and such cavity 36 of such measuring member 34 are substantially aligned so that such second predetermined amount of such predetermined powder may pass through such first aperture 22 and into such cavity 36 when such powder dispenser 10 is inverted, such spring means 38 exerting pressure on such measuring member 34 such that such measuring member 34 is predisposed to move generally towards such second position.

Figure 5:
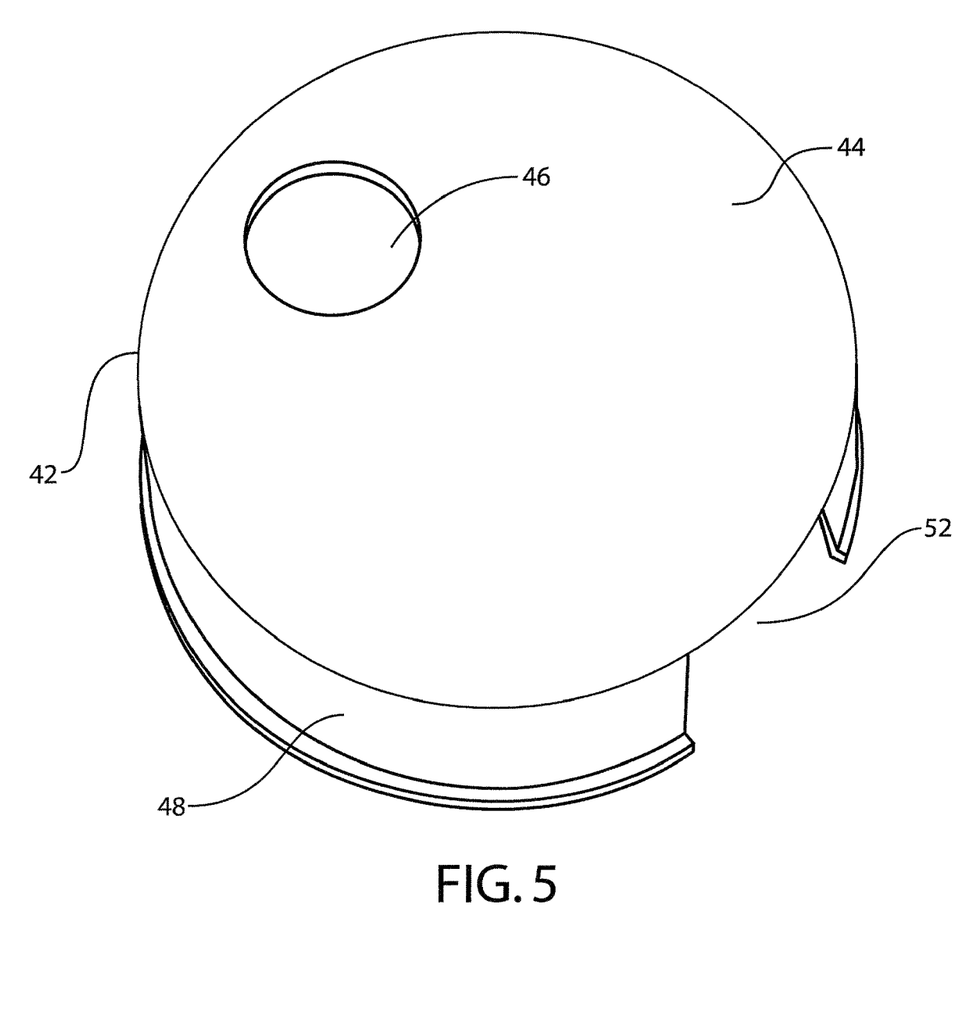
FIG. 5 is a partial perspective view of the second cover member of the invention according to one embodiment of the invention.
Figure 6:
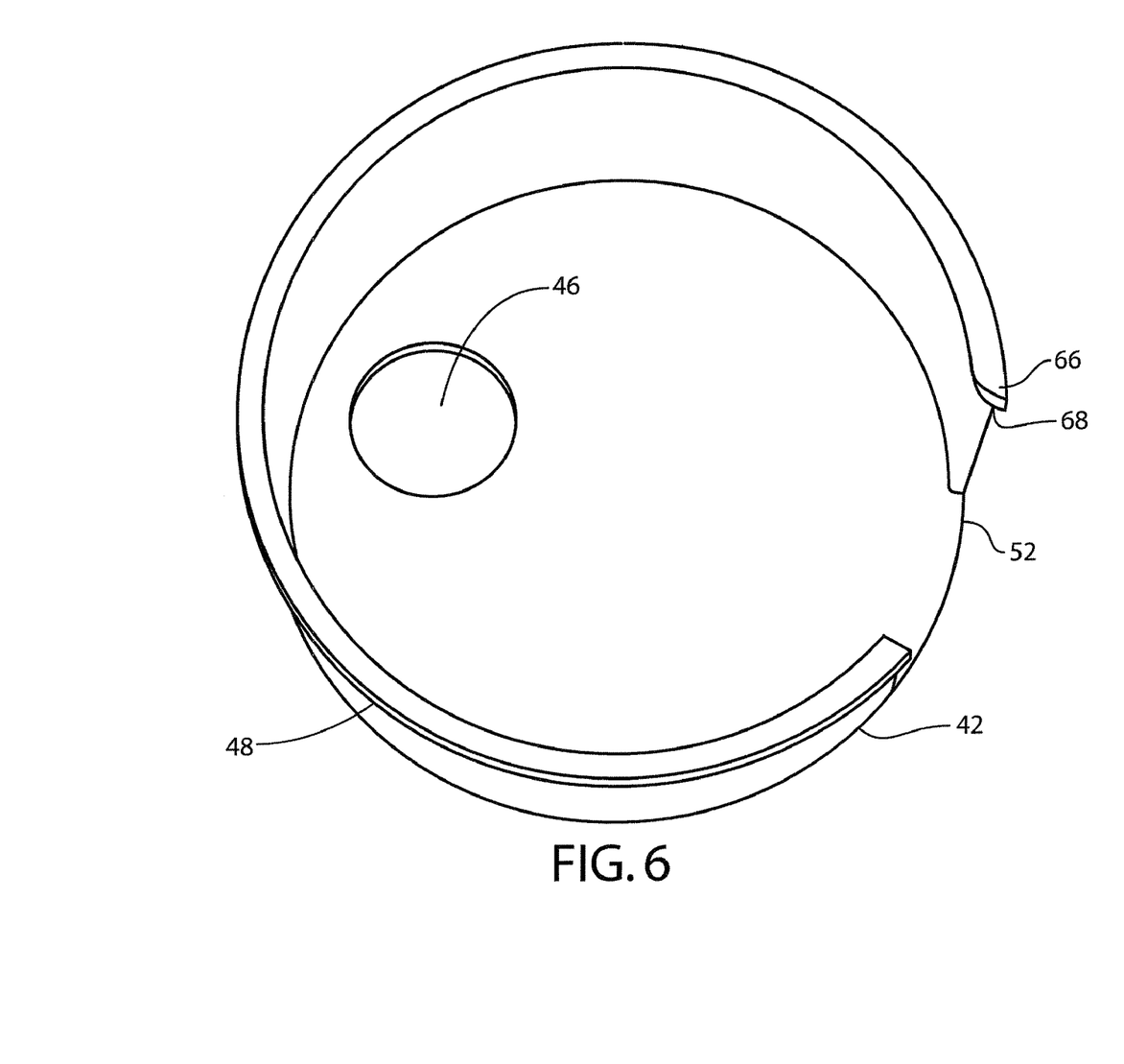
FIG. 6 is a partial perspective bottom view of the second cover member of the invention according to one embodiment of the invention.

A second cover member 42 is manufactured from a fourth predetermined material and has a fourth predetermined size and a fourth predetermined shape. It is presently preferred that such fourth predetermined material is plastic. Such second cover member 42 is for fitting over and at least partially enclosing such first cover member 18, such second cover member 42 includes a top covering portion 44 having a second aperture 46 disposed there through at a second predetermined location, at least one sidewall 48 extends downward from such top covering portion 44 closely adjacent edges there of and such at least one side wall 48 includes an opening 52 disposed there through at a third predetermined location for allowing such measuring member 34 to pass at least partially there through when such second cover member 42 is disposed on such first cover member 18 in a predetermined position. Such second cover member 42 further being rotatable around such first cover member 18 for enabling a user to position such measuring member 34 and such second cover member 42 such that at least one of such measuring member 34 is in such second position extending through such opening such that such first aperture 22 and such cavity 36 are aligned; such measuring member 34 is in such first position such that such cavity 36 and such second aperture 46 are aligned so that such second predetermined amount of such predetermined powder may be dispensed from such cavity 36 through such second aperture 46 into a predetermined container; such measuring member 34 is secured in such second position such that such cavity 36 and such second aperture 46 are not aligned so that such predetermined powder is prevented from being dispensed through such second aperture 46; and a combination thereof.

Figure 7:
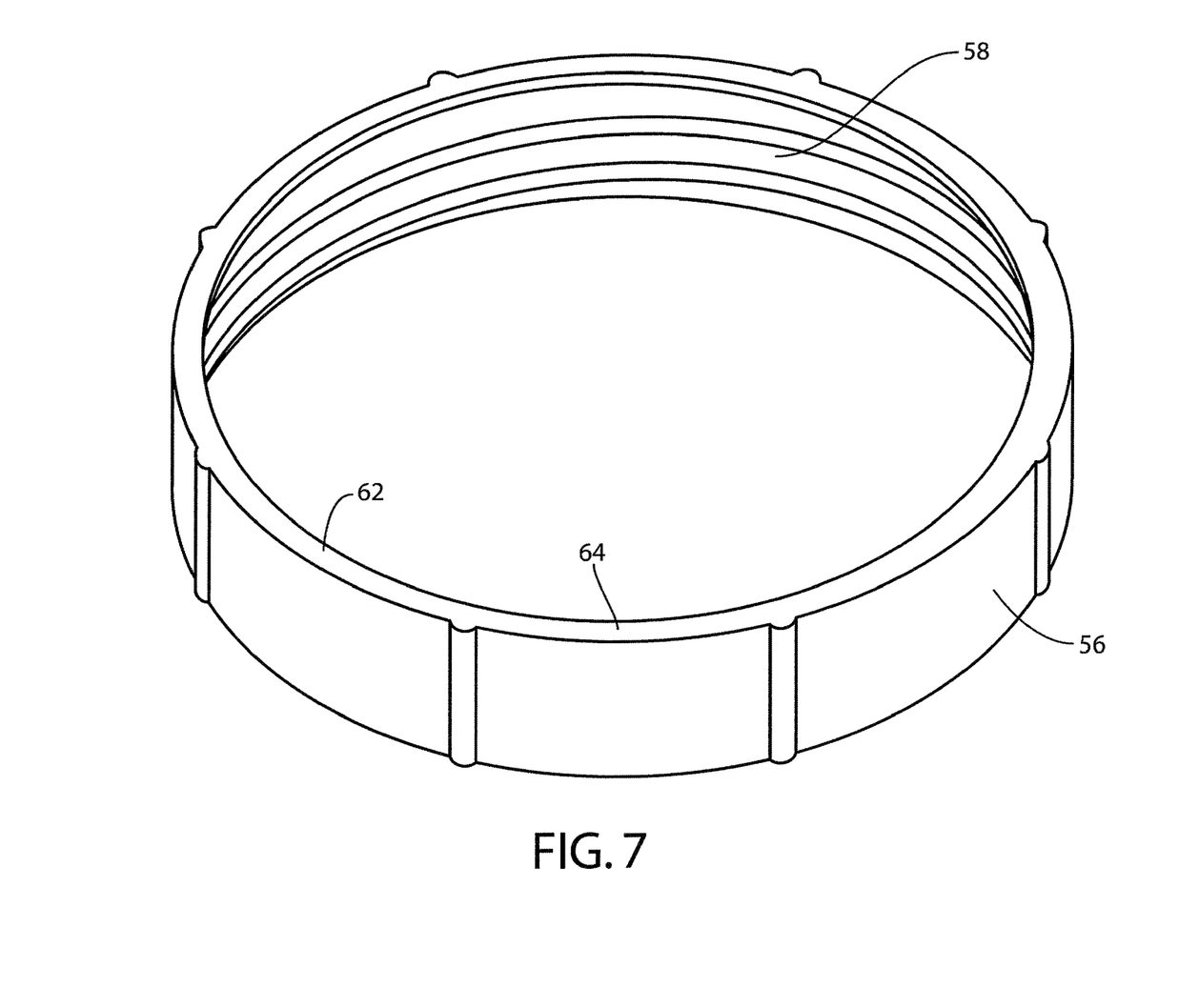
FIG. 7 is a partial perspective view of the ring member of the invention according to one embodiment of the invention.

It is presently preferred that such device 10 further includes a third threaded portion 53 disposed on a predetermined outer portion of such first cover member 18 and a ring member 56 having a threaded inner portion 58, such ring member 56 fitting over such second cover member 42 and engaging such first cover member 18 via such third threaded portion 53 screwing into such threaded inner portion 58.

It is further presently preferred that such ring member 56 further includes a first lip member 62 disposed closed adjacent a top inner edge 64 thereof and such second cover member 42 includes a second lip member 66 disposed closely adjacent a bottom outer lower edge 68 thereof. Such first lip member 62 for sitting closely adjacent and generally above such second lip member 66, such ring member 56 permitting rotatable movement of such second cover member 42 while such first lip member 62 and such second lip member 66 overlap to prevent such second cover member 42 from falling off such first cover member 18 when such powder dispenser 10 is inverted.

Figure 8:
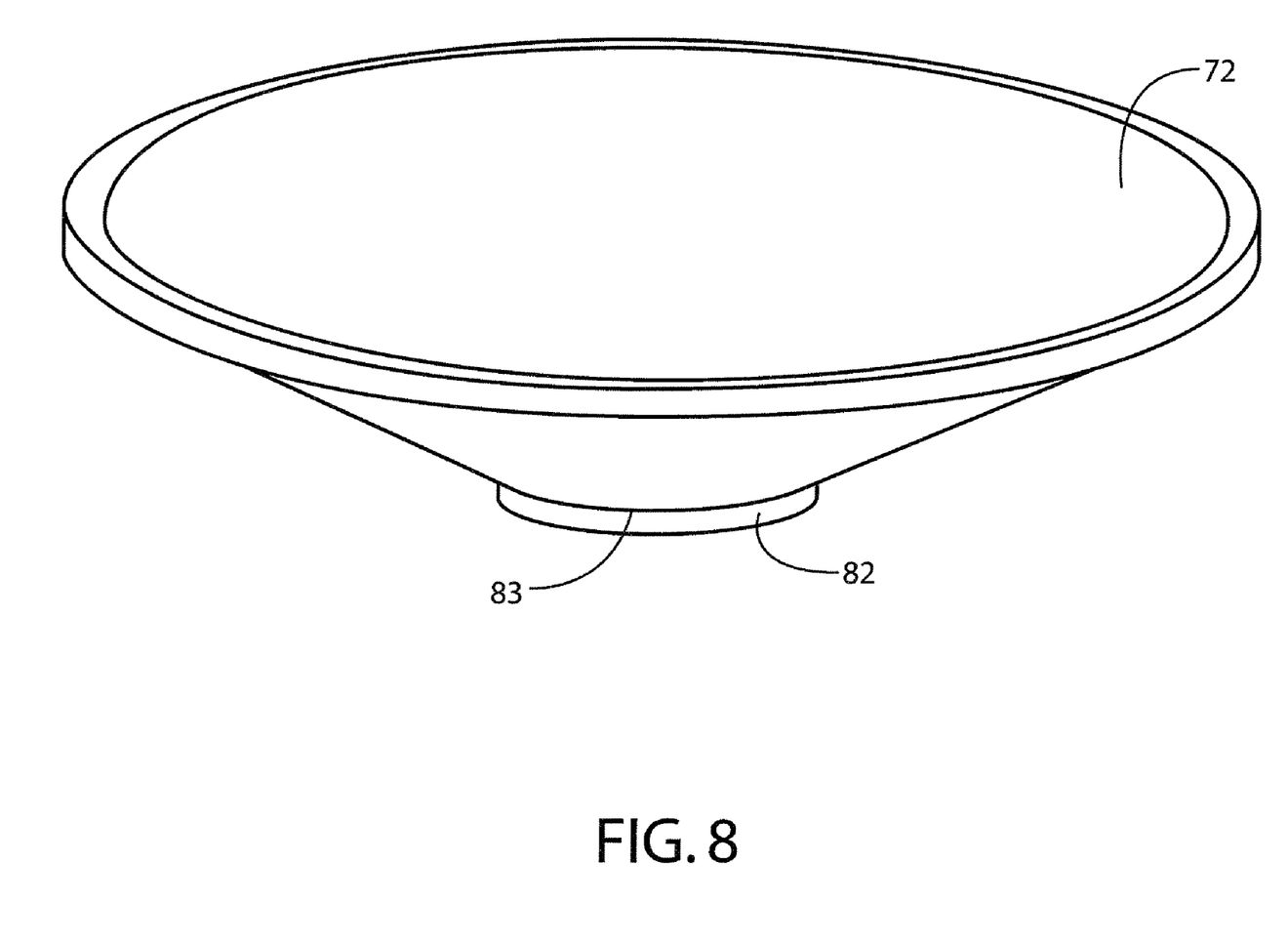
FIG. 8 is a partial perspective view of the funnel member of the invention according to one embodiment of the invention.
Figure 9:
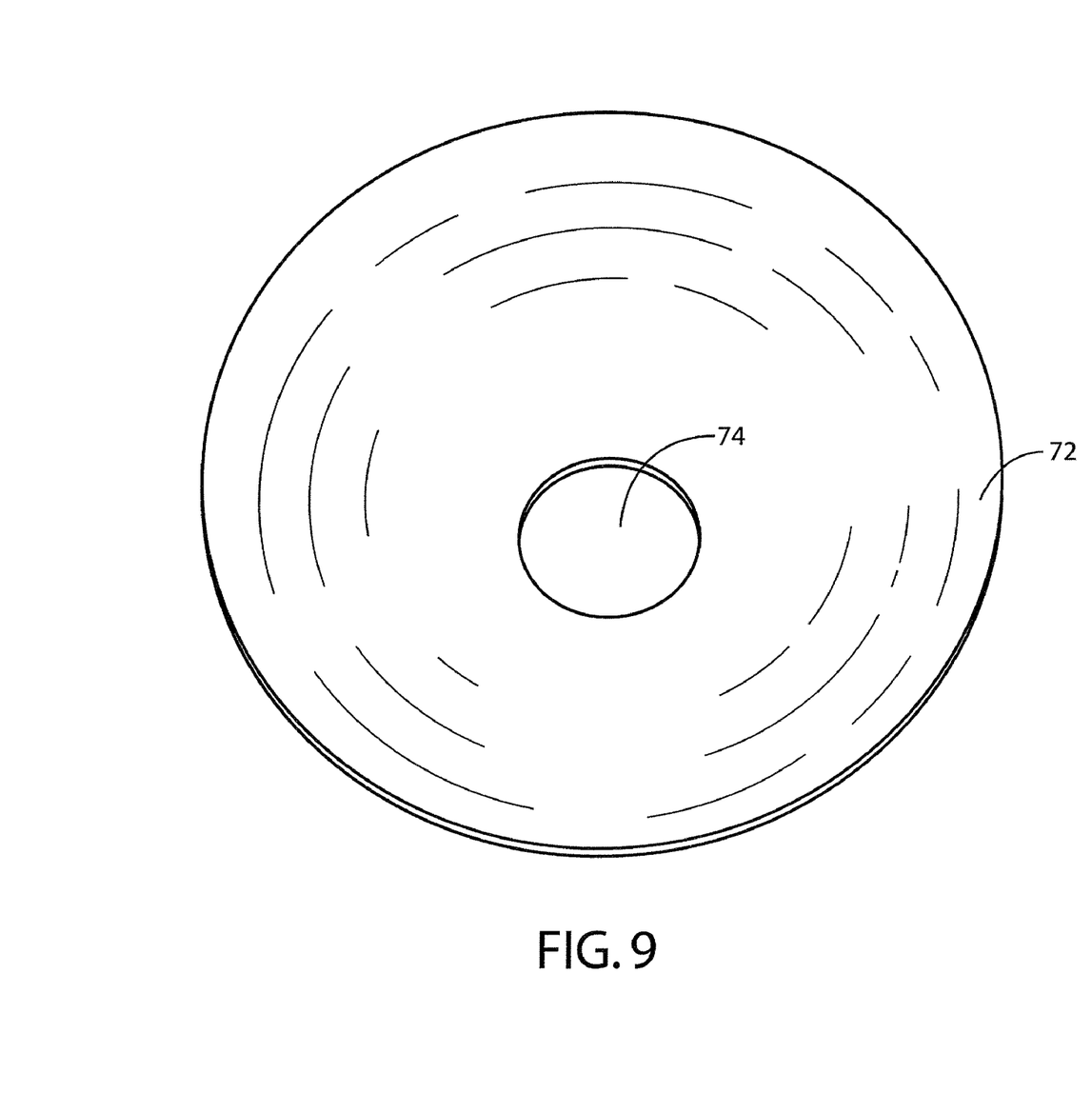
FIG. 9 is a partial perspective view of the funnel member according to one embodiment of the invention.
Figure 10:
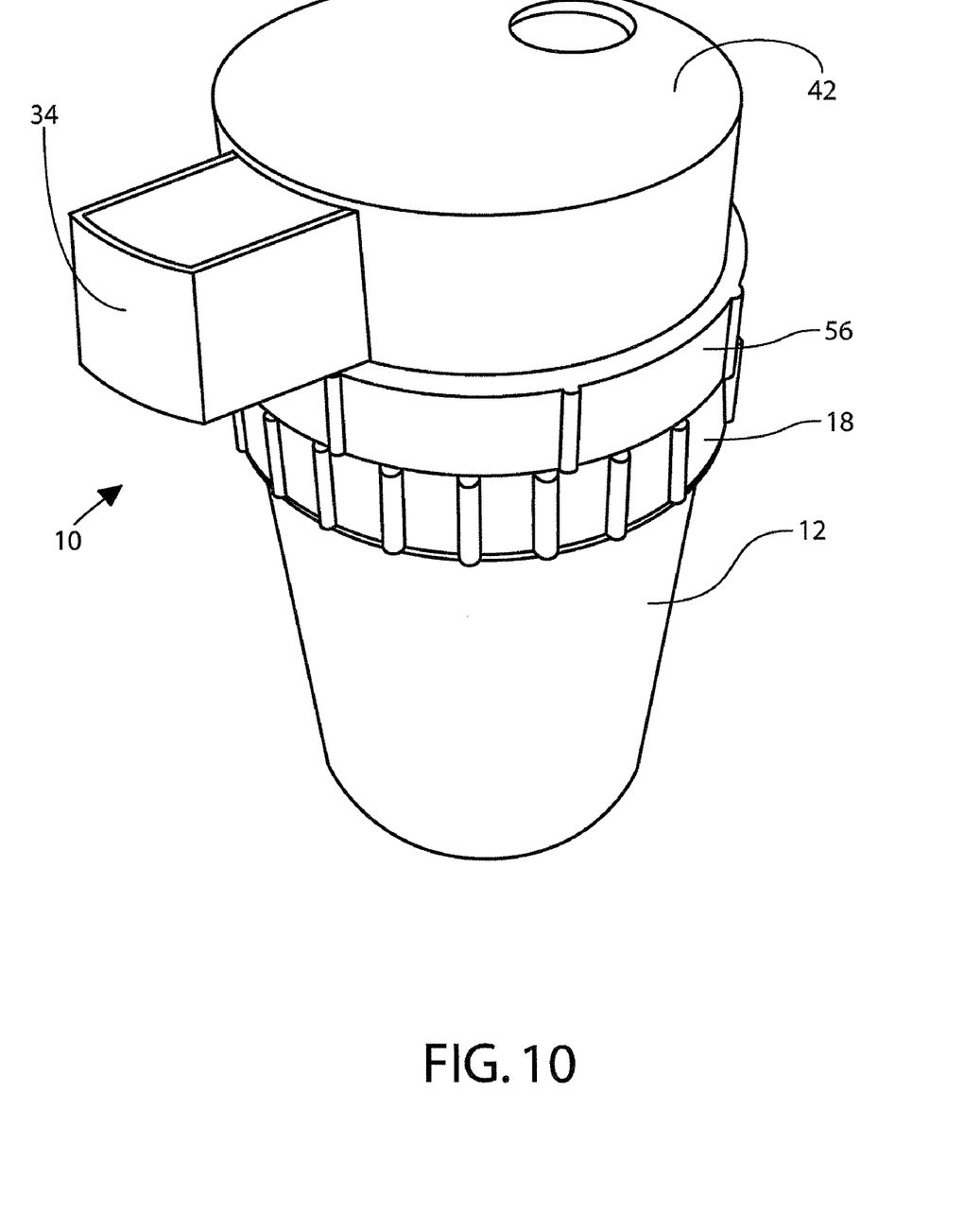
FIG. 10 is a partial perspective view of the invention according to one embodiment of the invention.

It is presently preferred that such device 10 further includes a funnel member 72 disposable between such open top end 14 of such housing member 12 and such first cover member 18. Such funnel member 72 includes a third aperture 74 disposed there through at a fourth predetermined location for alignment with such first aperture 22 of such first cover member 18. Preferably, such funnel member 72 includes a third lip member 82 disposed on a top portion 83 of such third aperture 74, such third lip member 82 fitting within such first aperture 22 for retaining such funnel member 72 closely adjacent an inner bottom portion 84 of such first cover member 18 via pressure.

It is meant that such device be easy to assemble and disassemble such that it can be refilled as necessary and/or desired. It is further meant that with a turn of such second cover the measuring member will be accessible to align as desired by a user to dispense powdered formula in about 1.0 ounce increments. A user would simply rotate the second cover member such that the measuring member extends out of such opening and such cavity is aligned with such first aperture, invert the housing such that such cavity is filled with such second predetermined amount of powder, push the measuring member all the way in so that such cavity is then aligned with such second aperture thereby allowing the powder within such cavity to be dispensed through such second aperture into a bottle or other container for mixing. Thereafter, the user may release the measuring member and the spring means will pressure the measuring member to return to the position wherein the cavity of the measuring member is aligned with the first aperture so the cavity may be refilled with powder and the dispensing process repeated. However, if the user is done dispensing powder then the housing may be returned to its original right side up position, the measuring member pushed into the interior of the first cover member and the second cover member rotated to secure such measuring member within such first cover member and such that the cavity of the measuring member is not aligned with the second aperture to prevent further dispensing of powder. The dispenser as described and illustrated is a most convenient device to the advantage of various users.

According to another embodiment, a method of dispensing powder from a powder dispenser including the steps of providing a powder dispenser including a substantially hollow housing member for receiving and housing a first predetermined amount of a predetermined powder, such housing member further having an open top end and a closed bottom end, a first cover member including a first aperture disposed there through at a first predetermined location for enabling such predetermined powder to pass there through and such first cover member being releasably engageable with such housing member closely adjacent such open top end, a measuring member including an open-ended cavity disposed there through for at least one of housing a second predetermined amount of such predetermined powder, transporting a second predetermined amount of such predetermined powder, dispensing a second predetermined amount of such predetermined powder, and a combination thereof, such measuring member being slidably connected to an interior portion of such first cover member via a spring means such that such measuring member is moveable between a first position within such interior portion of such first cover member wherein such first aperture of such first cover member and such cavity of such measuring member are not aligned and a second position wherein such measuring member extends substantially outside of such first cover member such that such first aperture of such first cover member and such cavity of such measuring member are substantially aligned so that such second predetermined amount of such predetermined powder may pass through such first aperture and into such cavity when such powder dispenser is inverted, such spring means exerting pressure on such measuring member such that such measuring member is predisposed to move generally towards such second position; a second cover member for fitting over and at least partially enclosing such first cover member, such second cover member includes a top covering portion having a second aperture disposed there through at a second predetermined location, at least one sidewall extends downward from such top covering portion closely adjacent edges there of and such at least one side wall includes an opening disposed there through at a third predetermined location for allowing such measuring member to pass at least partially there through when such second cover member is disposed on such first cover member in a predetermined position, such second cover member further being rotatable around such first cover member for enabling a user to position such measuring member and such second cover member such that at least one of such measuring member is in such second position extending through such opening such that such first aperture and such cavity are aligned, such measuring member is in such first position such that such cavity and such second aperture are aligned so that such second predetermined amount of such predetermined powder may be dispensed from such cavity through such second aperture into a predetermined container, such measuring member is secured in such first position such that such cavity and such second aperture are not aligned so that such second predetermined amount of such predetermined powder is prevented from being dispensed through such second aperture, and a combination thereof; filling such housing member with a predetermined amount of such predetermined powder; securing such first cover member to such housing member; securing such second cover member to such first cover member and moving such measuring member such that such first aperture is aligned with such cavity; inverting such powder dispenser such that such second predetermined amount of such predetermined powder fills such cavity; and moving such measuring member such that such cavity is aligned with such second aperture so that such second predetermined amount of such predetermined powder passes out of such cavity through such second aperture and into a predetermined container. It is presently preferred that such method further includes the step of shaking such powder dispenser in a predetermined manner after inverting such powder dispenser.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:
1. A powder dispenser comprising:
   a. a substantially hollow housing member for receiving and housing a first predetermined amount of a predetermined powder, said housing member being manufactured from a first predetermined material and having a first predetermined shape and a first predetermined size and having a first threaded portion disposed thereon closely adjacent an outer top portion thereof and said first cover member includes a second threaded portion disposed thereon closely adjacent a bottom inner portion thereof, said first threaded portion and said second threaded portion being engageable with each other, said housing member further having an open top end and a closed bottom end;
   b. a first cover member manufactured from a second predetermined material and having a second predetermined size and a second predetermined shape, said first cover member including a first aperture disposed there through at a first predetermined location for enabling said predetermined powder to pass there through and said first cover member being releasably engageable with said housing member closely adjacent said open top end;
   c. a measuring member manufactured from a third predetermined material and having a third predetermined size and a third predetermined shape, said measuring member including an open-ended cavity disposed there through for at least one of housing a second predetermined amount of said predetermined powder, transporting a second predetermined amount of said predetermined powder, dispensing a second predetermined amount of said predetermined powder, and a combination thereof, said measuring member being slidably connected to an interior portion of said first cover member via a spring means such that said measuring member is moveable between a first position within said interior portion of said first cover member wherein said 5 first aperture of said first cover member and said cavity of said measuring member are not aligned and a second position wherein said measuring member extends substantially outside of said first cover member such that said first aperture of said first cover member and said cavity of said measuring member are substantially aligned so that said second predetermined amount of said predetermined powder may pass through said first aperture and into said cavity when said powder dispenser is inverted, said spring means exerting pressure on said measuring member such that said measuring member is predisposed to move generally towards said second position;
   d. a second cover member manufactured from a fourth predetermined material having a fourth predetermined size and a fourth predetermined shape, said second cover member for fitting over and at least partially enclosing said first cover member, said second cover member includes a top covering portion having a second aperture disposed there through at a second predetermined location, at least one sidewall extends downward from said top covering portion closely adjacent edges there of and said at least one side wall includes an opening disposed there through at a third predetermined location for allowing said measuring member to pass at least partially there through when said second cover member is disposed on said first cover member in a predetermined position, said second cover member 5 further being rotatable around said first cover member for enabling a user to position said measuring member and said second cover member such that at least one of;
      i. said measuring member is in said second position extending through said opening such that said first aperture and said cavity are aligned;
      ii. said measuring member is in said first position such that said cavity and said second aperture are aligned so that said second predetermined amount of said predetermined powder may be dispensed from said cavity through said second aperture into a predetermined container;
      iii. said measuring member is secured in said second position such that said cavity and said second aperture are not aligned so that said predetermined powder is prevented from being dispensed through said second aperture; and iv. a combination thereof.

2. A powder dispensing device according to claim 1 wherein said device further includes a third threaded portion disposed on a predetermined outer portion of said first cover member and a ring member having a threaded inner portion, said ring member fitting over said second cover member and engaging said first cover member via said third threaded portion screwing into said threaded inner portion.

3. A powder dispensing device according to claim 2 wherein said ring member further includes a first lip member disposed closely adjacent a top inner edge thereof and said second cover member includes a second lip member disposed closely adjacent a bottom outer lower edge thereof, said first lip member for sitting closely adjacent and generally above said second lip member, said ring member permitting rotatable movement of said second cover member while said first lip member and said second lip member overlap to prevent said second cover member from falling off said first cover member when said powder dispenser is inverted.

4. A powder dispensing device according to claim 1 wherein said device further includes a funnel member disposable between said open top end of said housing member and said first cover member, said funnel member including a third aperture disposed there through at a fourth predetermined location for alignment with said first aperture of said first cover member.

5. A method of dispensing powder from a powder dispenser including the steps of:
   a. providing a powder dispenser including;
      i. a substantially hollow housing member for receiving and housing a first predetermined amount of a predetermined powder, said housing member having a first threaded portion disposed thereon closely adjacent an outer top portion thereof and said first cover member includes a second threaded portion disposed thereon closely adjacent a bottom inner portion thereof, said first threaded portion and said second threaded portion being engageable with each other, said housing member further having an open top end and a closed bottom end;
      ii. a first cover member including a first aperture disposed there through at a first predetermined location for enabling said predetermined powder to pass there through and said first cover member being releasably engageable with said housing member closely adjacent said open top end;
      iii. a measuring member including an open-ended cavity disposed there through for at least one of housing a second predetermined amount of said predetermined powder, transporting a second predetermined amount of said predetermined powder, dispensing a second predetermined amount of said predetermined powder, and a combination thereof, said measuring member being slidably connected to an interior portion of said first cover member via a spring means such that said measuring member is moveable between a first position within said interior portion of said first cover member wherein said first aperture of said first cover member and said cavity of said measuring member are not aligned and a second position wherein said measuring member extends substantially outside of said first cover member such that said first aperture of said first cover member and said cavity of said measuring member are substantially aligned so that said second predetermined amount of said predetermined powder may pass through said first aperture and into said cavity when said powder dispenser is inverted, said spring means exerting pressure on said measuring member such that said measuring member is predisposed to move generally towards said second position;

iv. a second cover member for fitting over and at least partially enclosing said first cover member, said second cover member includes a top covering portion having a second aperture disposed therethrough at a second predetermined location, at least one sidewall extends downward from said top covering portion closely adjacent edges there of and said at least one side wall includes an opening disposed there through at a third predetermined location for allowing said measuring member to pass at least partially therethrough when said second cover member is disposed on said first cover member in a predetermined position, said second cover member further being rotatable around said first cover member for enabling a user to position said measuring member and such second cover member such that at least one of said measuring member is in said second position extending through said opening such that said first aperture and said cavity are aligned, said measuring member is in said first position such that said cavity and said second aperture are aligned so that said predetermined powder may be dispensed from said cavity through said second aperture into a predetermined container, said measuring member is secured in said first position such that said cavity and said second aperture are not aligned so that said predetermined powder is prevented from being dispensed through said second aperture, and a combination thereof;

b. filling said housing member with a predetermined amount of said predetermined powder;

c. securing said first cover member to said housing member;

d. securing said second cover member to said first cover member and moving said measuring member such that said first aperture is aligned with said cavity;

e. inverting said powder dispenser such that said second predetermined amount of said predetermined powder fills said cavity; and f. moving said measuring member such that said cavity is aligned with said second aperture so that said second predetermined amount of said predetermined powder passes out of said cavity through said second aperture and into a predetermined container.

6. The method according to claim 5 wherein said method further includes the step of shaking said powder dispenser in a predetermined manner after inverting said powder dispenser.

\* \* \* \* \*